(12) United States Patent
Blazer et al.

(10) Patent No.: US 10,294,022 B2
(45) Date of Patent: May 21, 2019

(54) LATCH AND METHOD OF USE

(71) Applicants: Justin Taylor Blazer, O'Hara Township, PA (US); Quinten Joseph Blazer, O'Hara Township, PA (US)

(72) Inventors: Justin Taylor Blazer, O'Hara Township, PA (US); Quinten Joseph Blazer, O'Hara Township, PA (US)

(*) Notice: Subject to any disclaimer, the term of this patent is extended or adjusted under 35 U.S.C. 154(b) by 179 days.

(21) Appl. No.: 14/856,985

(22) Filed: Sep. 17, 2015

(65) Prior Publication Data
US 2017/0081119 A1  Mar. 23, 2017

(51) Int. Cl.
| | | |
|---|---|---|
| B60P 7/08 | (2006.01) | |
| B65F 1/16 | (2006.01) | |
| E05B 67/00 | (2006.01) | |
| E05B 73/00 | (2006.01) | |

(52) U.S. Cl.
CPC .......... *B65F 1/1615* (2013.01); *B60P 7/0823* (2013.01); *E05B 67/003* (2013.01); *E05B 73/0005* (2013.01); *Y10T 24/314* (2015.01); *Y10T 292/228* (2015.04); *Y10T 292/23* (2015.04); *Y10T 292/34* (2015.04)

(58) Field of Classification Search
CPC .... B65F 1/1615; B60P 7/0823; Y10T 24/314; Y10T 292/23; Y10T 292/34; Y10T 292/228; E05B 73/0005; E05B 67/003
USPC ...... 292/288, 258, 259 R, DIG. 71; 220/212, 220/214, 324, 315, 375
See application file for complete search history.

(56) References Cited

U.S. PATENT DOCUMENTS

| | | | | |
|---|---|---|---|---|
| 1,176,619 A | * | 3/1916 | Sykes | F16B 37/14 122/493 |
| 2,190,661 A | * | 2/1940 | Hauer | E05B 67/003 24/132 R |
| 2,350,706 A | * | 6/1944 | Sell | E05F 11/00 292/288 |
| 2,440,012 A | * | 4/1948 | Haver | G09F 3/0352 24/116 A |
| 2,608,711 A | * | 9/1952 | Moore | E05C 17/36 16/82 |
| 2,775,001 A | * | 12/1956 | Baker | E05B 65/0888 292/258 |
| 2,904,986 A | * | 9/1959 | Anderson | E05B 73/0005 70/78 |
| 2,924,476 A | * | 2/1960 | Deane | E05C 19/18 109/63.5 |
| 2,998,276 A | | 8/1961 | Shettler | |
| 3,124,381 A | | 3/1964 | Geldart | |
| 3,147,522 A | * | 9/1964 | Schumm | B65D 63/1081 24/16 PB |
| 3,306,483 A | * | 2/1967 | Frank | B65D 35/42 215/306 |
| 3,363,924 A | * | 1/1968 | Remig | B65F 1/1615 220/318 |

(Continued)

*Primary Examiner* — Kristina R Fulton
*Assistant Examiner* — Faria F Ahmad
(74) *Attorney, Agent, or Firm* — Richard W. James

(57) ABSTRACT

A system, apparatus, and method for latching objects includes an anchor and a strap. The apparatus includes an anchor for attachment to an object, the anchor having an insert void formed therein. The strap is stretchable and has an attachment on a first end and a hand grip on a second end. The strap also includes an insert between the first end and the second end, the insert fitting into the insert void of the anchor.

17 Claims, 9 Drawing Sheets

(56) References Cited

U.S. PATENT DOCUMENTS

| | | | | |
|---|---|---|---|---|
| 3,435,642 A * | 4/1969 | Del Pesco | E05B 67/003 | 24/115 R |
| 3,589,760 A | 6/1971 | Williams | | |
| 3,674,298 A * | 7/1972 | Vekony | B65D 45/02 | 292/258 |
| 3,817,563 A * | 6/1974 | McGlothlin | B65F 1/1615 | 220/318 |
| 3,893,725 A * | 7/1975 | Coulter | B65D 45/02 | 220/318 |
| 3,980,202 A | 9/1976 | Monyak et al. | | |
| 4,009,897 A * | 3/1977 | Spellman | B65F 1/141 | 220/218 |
| 4,194,657 A * | 3/1980 | Thor | A45F 5/02 | 206/3 |
| 4,325,238 A * | 4/1982 | Scherbing | E05B 67/003 | 70/18 |
| 4,413,851 A | 11/1983 | Ritter | | |
| 4,470,176 A * | 9/1984 | Vermeulen | A44B 11/00 | 24/163 R |
| 4,548,060 A * | 10/1985 | Campbell | E05B 73/0005 | 70/101 |
| 4,666,194 A * | 5/1987 | Charman | E05C 17/36 | 292/288 |
| 4,671,014 A * | 6/1987 | Lack | E05C 19/003 | 16/223 |
| 4,819,461 A * | 4/1989 | Pearson | E05B 67/383 | 292/259 R |
| 4,944,168 A * | 7/1990 | Kortenbrede | E05B 67/003 | 70/417 |
| 4,993,127 A * | 2/1991 | Mechem | A45C 13/30 | 224/257 |
| 5,004,114 A * | 4/1991 | Terbrusch | B65D 41/04 | 206/459.5 |
| 5,203,597 A * | 4/1993 | Wheelock | E05B 65/0014 | 292/258 |
| 5,209,533 A * | 5/1993 | Menard | E05C 19/18 | 292/258 |
| 5,297,692 A * | 3/1994 | Kronmiller | B65D 45/28 | 220/318 |
| 5,297,828 A * | 3/1994 | Chung | E05C 17/36 | 292/258 |
| 5,339,953 A * | 8/1994 | Alex | B65D 5/68 | 206/338 |
| 5,358,293 A * | 10/1994 | Bradley, Jr. | E05C 19/18 | 292/269 |
| 5,388,876 A * | 2/1995 | Saincome | E05C 3/041 | 292/218 |
| 5,481,764 A * | 1/1996 | Nelson | A47K 3/001 | 4/559 |
| 5,595,073 A * | 1/1997 | Sullivan | E05B 17/002 | 70/159 |
| 5,687,879 A * | 11/1997 | King | A47G 19/145 | 215/392 |
| 5,758,914 A * | 6/1998 | Ioveno | B65F 1/1615 | 220/375 |
| 5,765,712 A * | 6/1998 | Skinner | A45C 11/20 | 215/6 |
| 5,991,985 A * | 11/1999 | Galbreath | A44B 11/263 | 24/625 |
| 6,041,960 A * | 3/2000 | Leal | B65F 1/1615 | 215/306 |
| 6,085,931 A * | 7/2000 | Sadow | B65D 55/16 | 215/306 |
| 6,105,922 A * | 8/2000 | Derman | E05B 67/383 | 248/205.3 |
| 6,233,782 B1 * | 5/2001 | Regele | F16L 5/10 | 16/2.1 |
| 6,902,081 B2 | 6/2005 | Walker | | |
| 7,172,224 B2 * | 2/2007 | Carter | E05C 17/042 | 292/262 |
| 7,175,149 B2 * | 2/2007 | Gallien | A47B 97/00 | 248/499 |
| 7,325,281 B1 * | 2/2008 | Willems | B60R 25/00 | 24/302 |
| 7,810,854 B2 * | 10/2010 | Hodge | B65F 1/1615 | 220/315 |
| 7,909,199 B2 * | 3/2011 | Cahill | B65F 1/16 | 220/375 |
| 8,544,803 B2 * | 10/2013 | Ball | F25D 23/00 | 248/154 |
| 9,184,573 B1 * | 11/2015 | Jonas | E05B 65/0089 | |
| 9,284,760 B2 * | 3/2016 | Canaday | E05C 19/003 | |
| 2005/0194797 A1 * | 9/2005 | Radel | E05B 63/128 | 292/288 |
| 2005/0262904 A1 * | 12/2005 | Ling | E05B 67/003 | 70/49 |
| 2007/0085352 A1 * | 4/2007 | Ulanday | E05C 17/365 | 292/288 |
| 2011/0120197 A1 * | 5/2011 | Molesan | A63C 11/006 | 70/58 |
| 2011/0219826 A1 * | 9/2011 | Jeli | B62H 5/003 | 70/15 |

* cited by examiner

LATCH AND METHOD OF USE

FIELD OF THE INVENTION

The present invention is concerned with latching cans and securing loads. An embodiment of the invention latches a garbage can lid securely on the can to prevent intrusion by wildlife.

BACKGROUND OF THE INVENTION

Animals and other wildlife have been the bane of garbage cans maintained out of doors. Many apparatuses and methods have been employed to prevent animals from gaining access to garbage cans and moving garbage outside the can where it can be difficult and unpleasant to move the garbage back into the can.

Thus, there is a need for a garbage can latch and method of use that is both simple to use and effective against undesired entry.

Certain embodiments of the present latch can furthermore be used to retain things other than a garbage can in a closed position. For example, other lids may be secured using the present latch, including cooler lids latched to coolers, equipment and tools may be retained on a trailer or in a truck bed using the present latch, and other things that are amenable to tying-down may be secured or retained using the present latch.

Thus there is also a need for a latch that can be simply used for tying down or clamping needs.

SUMMARY OF THE INVENTION

Embodiments of the present latch are directed to systems, methods and apparatuses for latching, tying down, securing, or otherwise retaining one or more objects.

In accordance with one embodiment of the present latch, the latch includes an anchor and a strap. The anchor is for attachment to an object and includes a slot formed therein. The strap has a loop on a first end, a hand grip on a second end, and an insert between the first end and the second end, the insert having a width such that the insert fits into the slot of the anchor.

In accordance with another embodiment of the latch, the latch has an anchor and a strap, the anchor having an insert void for holding an insert on a strap between a first surface and a second surface attached to the first surface. The insert void is open to a slot formed in the second surface from an insert opening on a first side of the anchor to a strap opening on a third side of the anchor opposite the first side. The insert opening at the first side is larger than the insert for placement of the insert into the insert void, and the strap opening at the third side is larger than the strap and smaller than the insert to retain the insert in the insert void of the anchor while the strap passes through the strap opening. The slot is wider than the strap. The strap has a width smaller than the strap opening in the anchor, a length, first and second ends along the length, a connecting apparatus on the first end, a hand grip on a second end, and an insert between the first end and the second end. The insert has a cross section smaller than the insert opening of the anchor, larger than the strap opening in the anchor, and larger than the slot of the anchor, such that the insert can enter the anchor through the insert opening, cannot exit the anchor through the strap opening, and cannot exit the anchor through the slot.

In another embodiment, a latch includes and anchor and a strap, the anchor having a cavity for insertion of a strap and insert therein. The cavity is open through the anchor on a first side and an opposing second side. The anchor has a slot formed therein that extends into the cavity from the first side to the second side and has a width, the first side opening being larger than an insert and the second side opening being smaller than the insert. The slot is wider than a strap to which the insert is attached. The strap has a width smaller than the slot in the anchor, a length, a loop on a first end along the length of the strap, a hand grip on a second end along the length of the strap, and an insert between the first end of the strap and the second end of the strap. The insert is smaller than the cavity of the anchor, has a width smaller than the width of the opening through the anchor on the first side and a depth smaller than the depth of the opening through the anchor on the first side and at least one of a width larger than the width of the opening through the anchor on the second side and a depth larger than the depth of the opening through the anchor on the second side, such that the insert can enter the anchor through the opening through the anchor on the first side and cannot exit the anchor through the opening through the anchor on the second side.

In an embodiment, a method of using the latch includes wrapping a strap having a length and a width around an object and inserting a first end having a hand grip and an insert formed on the strap having a width greater than the strap through an eye at a second side of the strap, pulling the strap by the hand grip so that the strap stretches until the strap passes over and the insert is beyond an anchor and aligned with a slot in the anchor, and inserting the insert into the anchor.

Accordingly, the present invention provides solutions to the shortcomings of prior latching systems, apparatuses, and methods. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of embodiments of the present latch and methods of using the present latch.

DETAILED DESCRIPTION OF THE INVENTION

Reference will now be made to embodiments of latch apparatuses, systems, and methods, examples of which are illustrated in the accompanying drawings. Details, features, and advantages of the latch and its use will become further apparent in the following detailed description of embodiments thereof. It is to be understood that the figures and descriptions included herein illustrate and describe elements that are of particular relevance to latch apparatuses, systems, and methods, while eliminating, for purposes of clarity, other elements such as the variety of items that can be retained or clamped using the latch.

Latch systems and apparatuses, and methods for latching are described herein. Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term.

Figure 1:
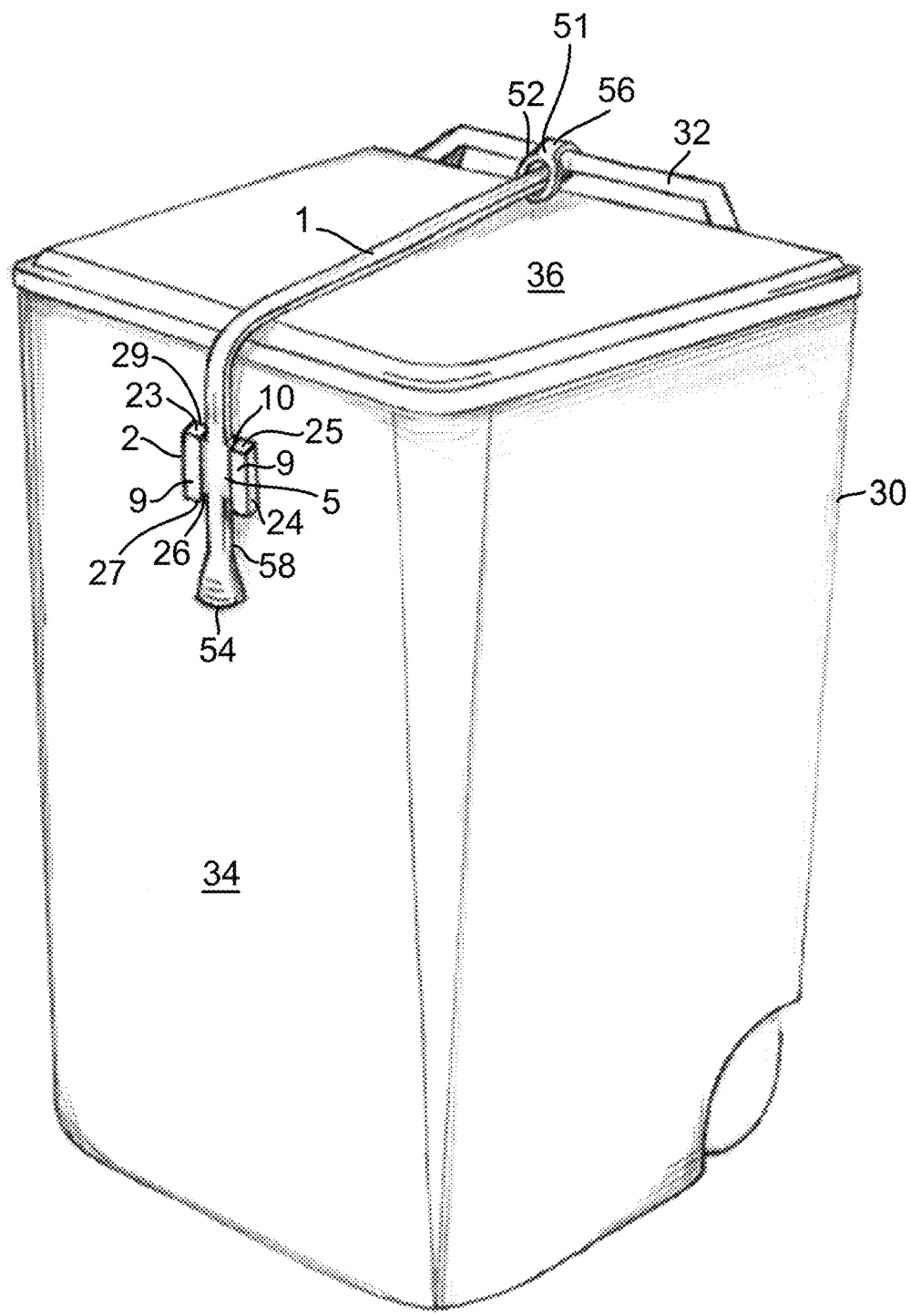
FIG. 1 illustrates a perspective view of an embodiment of a latch of the present invention applied to a garbage can.

FIG. 1 illustrates an embodiment of a latch of the present invention. The latch includes a strap 1 and an anchor 2. In that embodiment, the anchor 2 is attached to a front wall 34 of a garbage can 30 and the strap 1 is attached to a handle 32 of the garbage can 30.

In the embodiment shown in FIG. 1, the anchor 2 is square and includes a back plate 11 (depicted in FIGS. 3 and 4), a parallel front plate 9, and walls 22 (shown in FIG. 3) and 24 with wall extensions 23 and 25 that connect the back plate 11 to the front plate 9. An insert void 40 is situated between the back plate 11 and the front plate 9. The anchor 2 includes openings to the insert void 40, including an insert opening 41 in a first side of the anchor 2 between the back plate 11 and the front plate 9, a strap opening 10 in a third side of the anchor 2 between the back plate 11 and the front plate 9, and a slot 26 extending from the insert opening 41 to the strap opening 10 along the length of the front plate 9.

Figure 4:
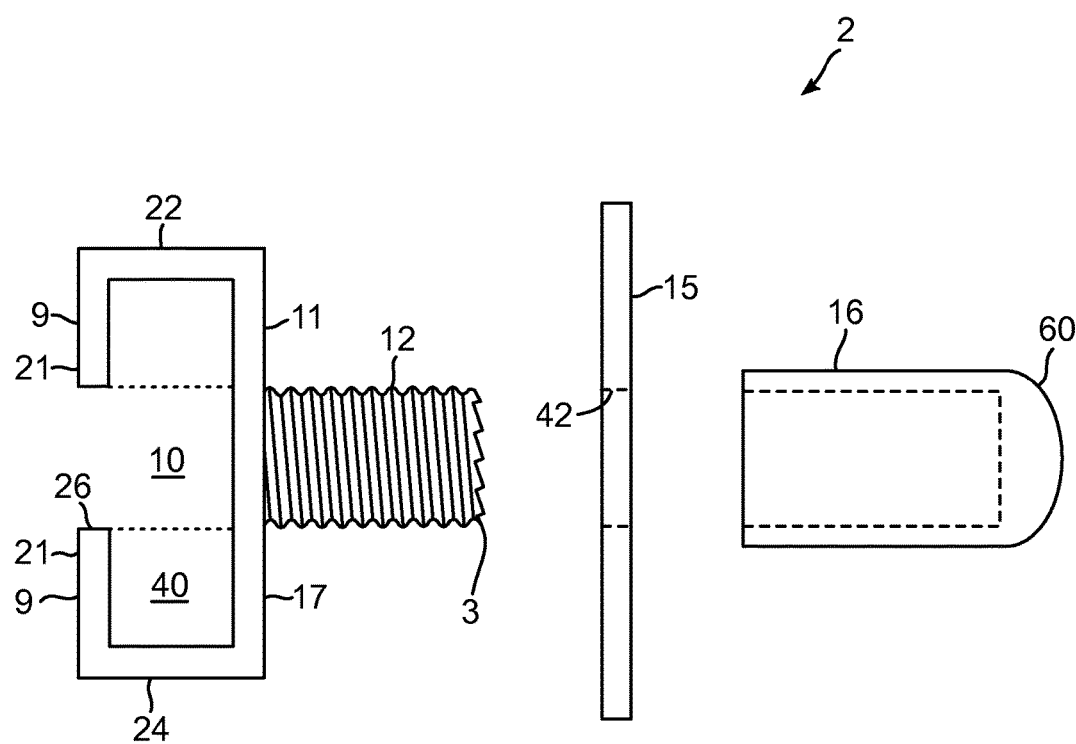
FIG. 4 illustrates a bottom exploded view of the embodiment of the anchor illustrated in FIG. 3.
Figure 7:
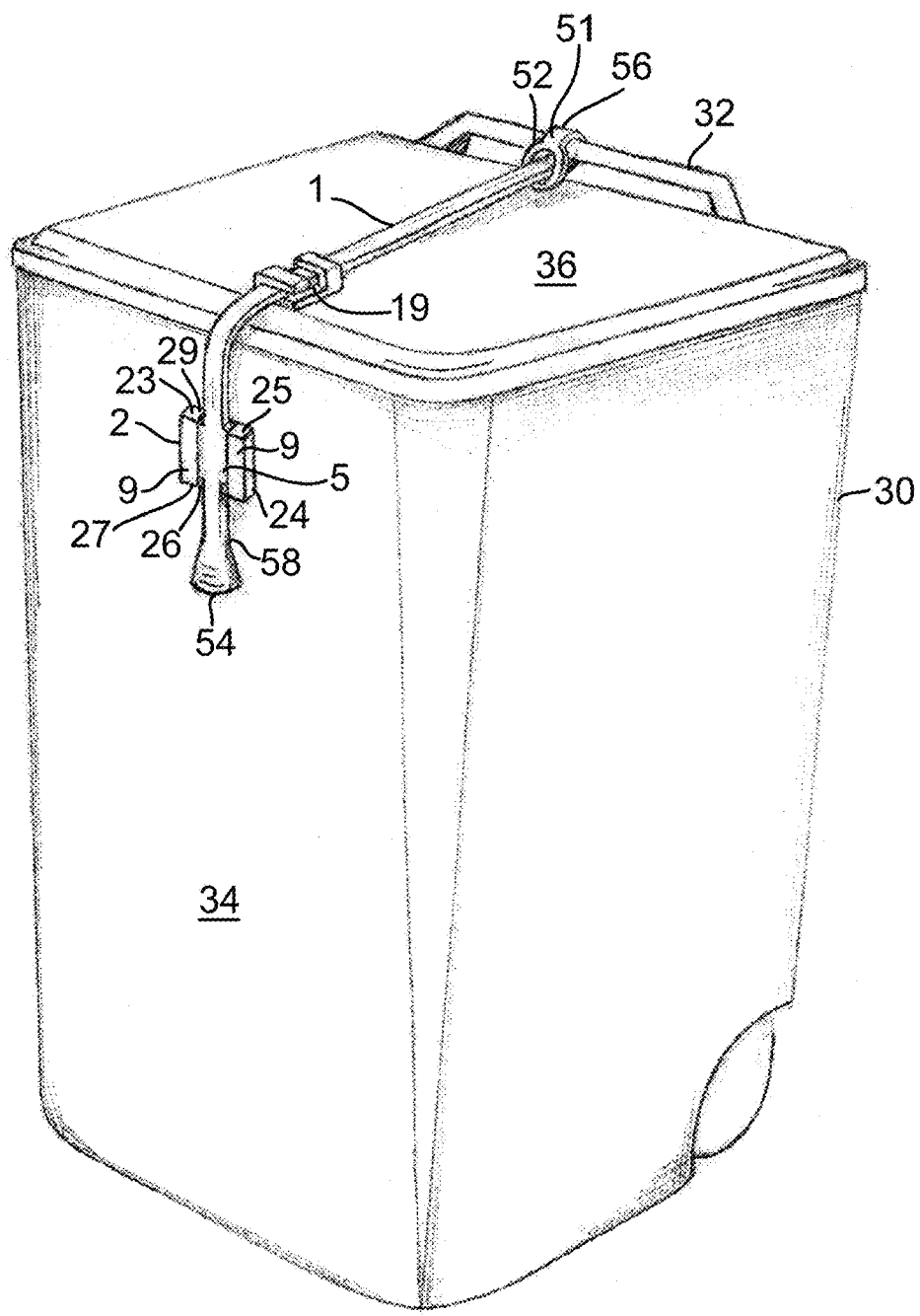
FIG. 7 illustrates a perspective view of another embodiment of a latch of the present invention having a strap retainer.
Figure 10:
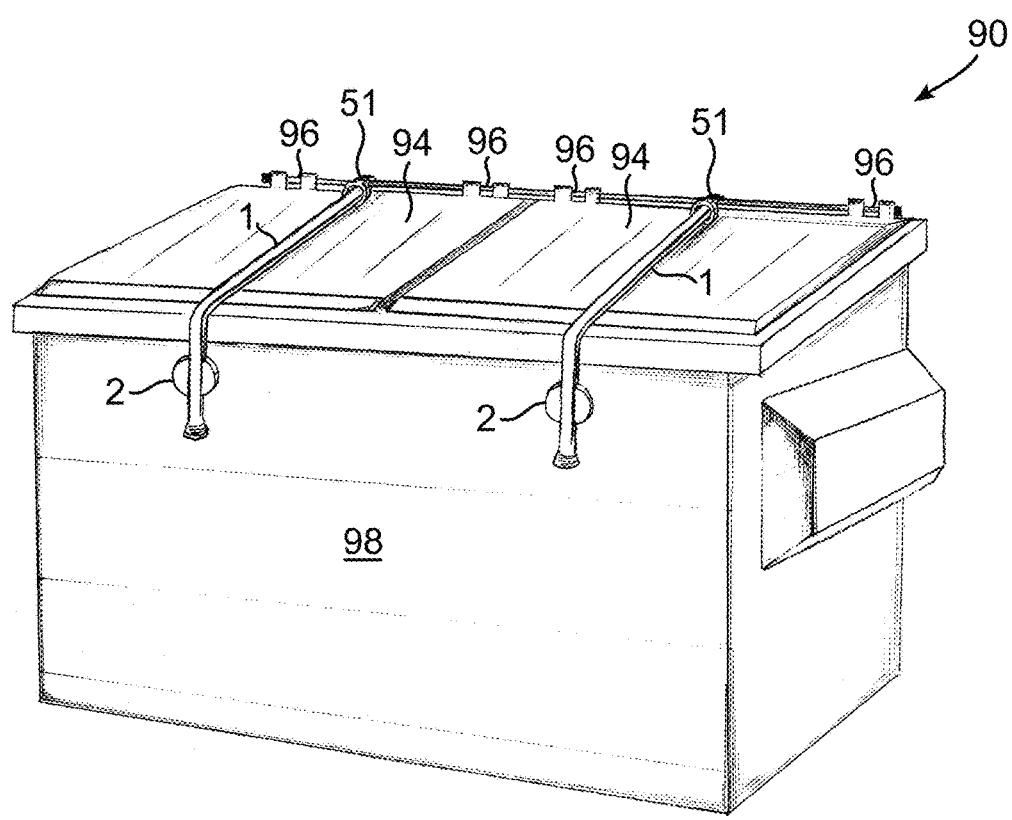
FIG. 10 illustrates an embodiment in which two latches of the present invention secure a pair of lids on a large container.

The back plate 11 illustrated in the embodiment shown in FIG. 4 includes an attachment surface 17 for attachment to an object, such as the front wall 34 of the garbage can 30 illustrated in FIG. 1, the front wall 34 of the garbage can 30 illustrated in FIG. 7 or the front wall 98 of a box 90 as illustrated in FIG. 10. The back plate 11 may alternately be formed on an object, such as the front wall 34 of the garbage can illustrated in FIG. 1, the garbage can illustrated in FIG. 7, the container illustrated in FIG. 10, the bed or wall of a truck or trailer, or elsewhere as desired. The front plate also includes a front surface 21.

The strap 1 is elongated and made of a material that is stretchable, such as a form of rubber or rubberized composite. In one embodiment, the strap 1 is made entirely or partially of EPDM rubber. The strap 1 includes a connecting apparatus 51, which in this embodiment is a loop 52 at a first end 56 and a hand grip 54 at a second end 58 of a body 4. The strap 1 also includes an insert 5 along the body between the first end 56 and the second end 58, but nearer the second end 58 than the first end 56 in the embodiment illustrated in FIG. 1.

In the embodiment shown in FIG. 1, the strap 1 passes around the handle 32 of the garbage can 30 and through the loop 52 of the strap 1 to attach the strap 1 to the garbage can handle 32. The insert 5 is inserted into the slot 26 in the anchor 2 with the strap 1 passing through the strap opening 10.

In operation, the strap 1 may be affixed to the garbage can 30, such as by affixing the strap 1 to the garbage can 30 handle 32 as shown in FIG. 1. The strap 1 may be stretched by pulling on the hand grip 54 until the insert 5 is beyond the slot 26 in the anchor 2. The strap 1 may then be moved toward the garbage can 30 and the pulling force on the strap 1 may be reduced, permitting the insert 5 to enter the slot 26 of the anchor 2. The hand grip 54 may be fully released when the insert 5 has entered the slot 26 such that the insert 5 impinges on the wall extensions 23 and 25 of the anchor 2 and is enclosed in the slot 26 by the walls 22 and 24. When the insert 5 has an appropriate shape, such as the disk shape insert 5 illustrated in FIG. 2, the insert 5 may impinge on the walls 22 and 24 when it is inserted into the anchor 2.

When the strap 1 is moved toward the garbage can 30 with the strap 1 stretched and the insert 50 passing across and beyond the anchor 2, the strap 1 may move into the slot 26 through the strap opening 10. The strap opening 10 may be about the same width or wider than the strap 1 so that the strap 1 may be inserted through the strap opening 10.

Figure 3:
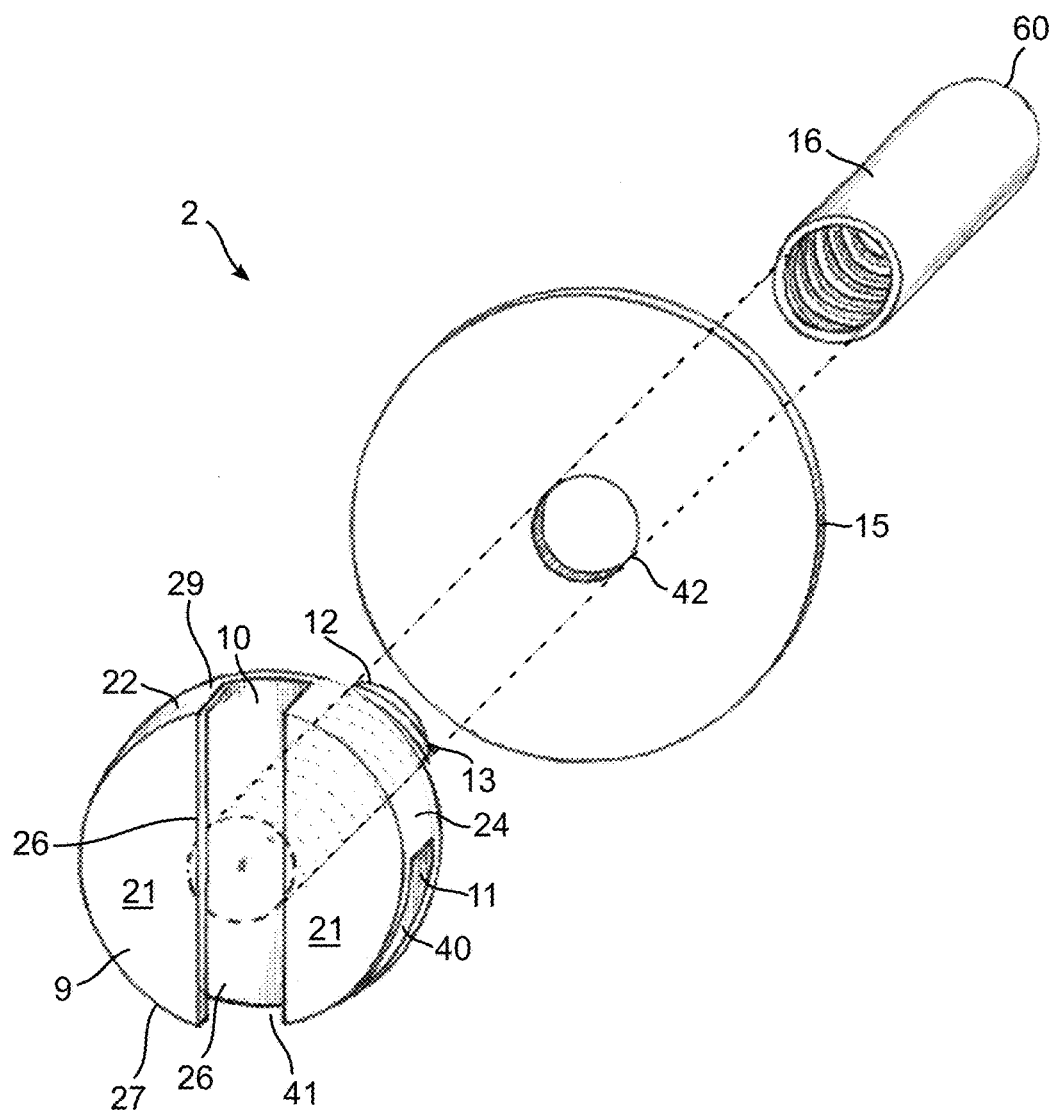
FIG. 3 illustrates an exploded perspective view of an embodiment of an anchor of the present invention.

The anchor 2 can be attached to a surface, such as the front wall 34 of the garbage can 30 illustrated in FIG. 1, in a variety of ways, including by way of a post 12 (as illustrated in FIG. 3) that extends through the front wall 34 of the garbage can 30 and is affixed inside the garbage can 30, by an adhesive that may be applied to the attachment surface 17 of the back plate 11, by magnetic force between a magnet in the anchor 2 and a ferrous surface, from a magnet through a surface to which the anchor 2 is to be attached to a ferrous surface in the anchor 2, or as desired.

In yet another embodiment, the anchor is formed, by molding or casting, for example, on the surface to which the anchor 2 is desired to be attached. For example, in the embodiment illustrated in FIG. 1, the anchor 2 may be formed on or with the front wall 34 of the garbage can 30.

In an embodiment, the strap 1 may be designed to be affixed to the handle 32 of the garbage can 30 and to the anchor 2 on the other end to accomplish the goal of keeping the garbage can lid 36 in a closed position. The strap 1 may be fabricated out of any desired material capable of being flexible and expanded or stretched and producing contracting tension force when stretched or expanded. One end 56 of the strap 1 may consist of a connecting apparatus 51, which in this embodiment is an eyelet 52 having an enclosed area capable of allowing the entirety of the remainder of the strap 1 to pass through the eyelet 52. From the eyelet along the length of the strap 1, the strap 1 includes a section 4 of any desired length that spans the distance between the eyelet 52 and the first insert 5. The insert 5 may have more girth than the section 4 that spans the distance between the eyelet 52 and the first insert 5. The insert 5 may be of any desirable shape, size, type, or configuration and may have flat surfaces or shaped surfaces. Thus, the insert may have one flat surface, two flat surfaces, or no flat surfaces as best fits the insert void 40 in the anchor 2 in which the insert 5 is to be disposed and the application in which the insert 5 is used.

In an embodiment of a method of using the latch as it is illustrated in FIGS. 1 and 7, the strap 1 may be wrapped around one of the handles 32 of a garbage can 30 and the grip 54 of the strap 1 may be threaded through the eyelet 52 of the strap 1 to affix the strap 1 to the handle 32. Where the anchor 2 is not formed on the garbage can 30 and the post 12 includes a cutting portion, the anchor 2 may be secured to the garbage can 30 by first creating a pilot hole in the front wall 34 of the garbage can 30, then enlarging the hole to the appropriate size by rotating the anchor 2 with the post 12 engaging the pilot hole until the post 12 creates a hole in the desired place on the garbage can, such as the front wall 34 of the garbage can 30, through which the post 12 will fit. Then the washer 15 may be placed on the post 12 of the anchor 2, followed by the cap 16, which may be turned to secure the anchor 2 to the front wall 34 of the garbage can 30. Then, by pulling an insert 5 of the strap 1 past the catch 26 of the anchor 2, and finally by allowing the tension from the strap 1 to pull the insert 5 up into the catch 26 of the anchor 2, the lid 36 will be secured to the garbage can 30 in a closed position. To open the lid 36, the strap 1 only needs to be pulled until the insert 5 that was housed in the catch 26 is below the catch 26 and then the strap 1 may be pulled away from the can 30 to free the insert from the catch completely and allow the garbage can 30 to be opened. When the strap 1 is not secured in the anchor 2, both the anchor 2 and strap 1 may remain attached to the can 30.

It should be noted that such a process may be performed to hold any lid or object in place and the garbage can 30 is only used as an example.

Figure 2:
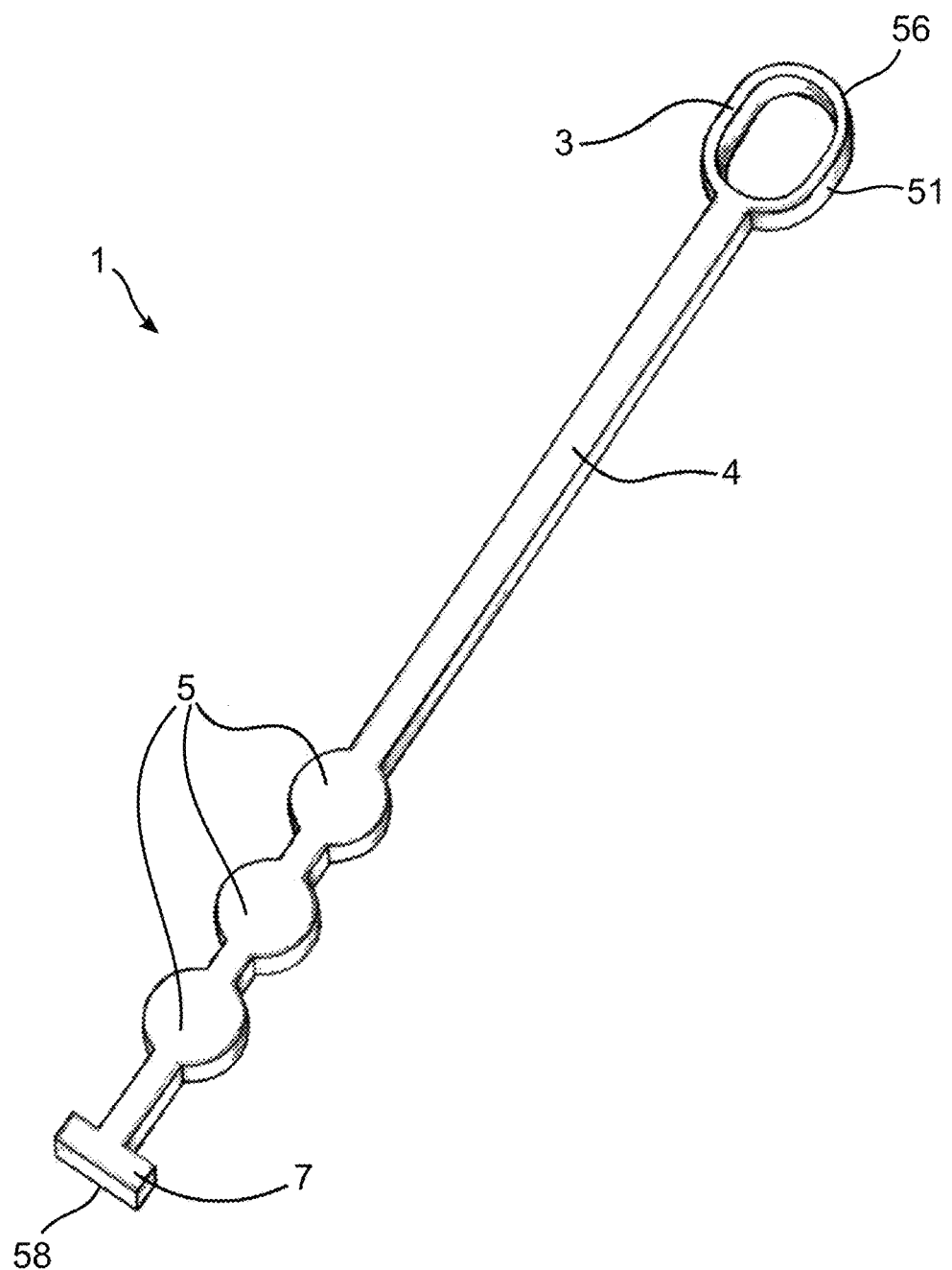
FIG. 2 illustrates a perspective of an embodiment of a strap of the present invention.

FIG. 2 illustrates an embodiment of a strap 1 that includes a connecting apparatus 51, which in this embodiment is an elongated loop 3 at the first end 56, a T-shaped hand grip 7 at the second end 58, and three disc-shaped inserts 5 along a body 4 between the first and second ends 56 and 58.

Following the first insert 5 there may be any desired number of additional inserts 5 to allow for adjustable strap 1 lengths and various tensions to be applied to the strap 1 in order to accommodate garbage cans 30 and other applications of various shapes and sizes, as may be seen in FIG. 2. At the end of the strap 1 opposite the first end 56 in that embodiment is a grip 7. The grip 7 may also have more girth than the section 4 spanning the majority of the length of the strap 1. In addition to being a convenient place to grasp the strap 1, the grip 7 may also be a tension free section of the strap 1 on which to grasp the strap 1.

More than one insert 5 may be desirable on a strap 1, for example, to accommodate varying distances from the first end 56 of the strap 1 to the anchor 2. For example, in an embodiment, the strap 1 has a body that is 30 inches long from the loop 3 to the insert 5 closest to the loop 3. Each insert in that embodiment has a 4-inch diameter and the length of the body 4 between the inserts 5 is 5 inches. With such an arrangement, if the anchor 2 is located 30 inches to 39 inches from the location where the loop 3 is attached, a user can stretch the strap 1 until the insert 5 closest to the loop 3 is beyond the anchor 2, move the hand grip 7 of the strap 1 until the insert 5 closest to the loop 3 is aligned with the slot 26, and then release the stretching force on the strap 1 such that the insert 5 closest to the loop 3 rests in the slot 26. If the anchor 2 is located 39 inches to 48 inches from the location where the loop 3 is attached, a user can stretch the strap 1 until the center insert 5 is beyond the anchor 2, move the hand grip 7 of the strap 1 until the center insert 5 is aligned with the slot 26, and then release the stretching force on the strap 1 such that the center insert 5 rests in the slot 26. If the anchor 2 is located 48 inches or further from the location where the loop 3 is attached, a user can stretch the strap 1 until the insert 5 closest to the hand grip 7 is beyond the anchor 2, move the hand grip 7 of the strap 1 until the insert 5 closest to the hand grip 7 is aligned with the slot 26, and then release the stretching force on the strap 1 such that the insert 5 closest to the hand grip 7 rests in the slot 26.

In certain embodiments, the body 4 of the strap 1 is the primary stretchable portion of the strap 1. In such an embodiment, portions of the strap 1, such as the loop 3, one or more of the inserts 5, or the grip 7 may be partially or completely made of other materials than the body 4 and may not be stretchable or may be less stretchable than the body 4 of the strap 1. For example, the inserts 5 may be made of metal or plastic that is encompassed by the body 4 material. The hand grip 7 and loop 3 may also be made of metal or plastic and the strap 1 may be formed around that material to make those parts less pliable or give those parts a more rigid form. In another embodiment, the entire strap 1 is made of the same material.

Rounded or partially rounded inserts 5 may be desirable since the rounded corners can assist in guiding the insert 5 into the slot 26 when the insert 5 is not centered on the slot by sliding sideways if the insert 5 encounters a wall 22 or 24 when entering the slot 26. The inserts 5 may be formed in various shapes, including square, rectangular, triangular, round, or oval, and may have shape in all three dimensions, such as a pyramid shape, a top shape, a cylinder shape, a spherical shape, any of those shapes with one side made flat to lie against the surface to which the anchor 2 is attached or formed, or another desired shape that best meets the application in which the latch is used.

FIG. 3 illustrates the anchor 2 in an embodiment in which the anchor 2 is to be affixed to a surface, such as the front wall 34 of the garbage can 30, using a post 12 that is threaded. In such an embodiment, a hole may be created through a material where the anchor 2 is to be affixed. For example, in the embodiment illustrated in FIG. 1, the hole may have been created in the front wall 34 of the garbage can 30. The threaded post 12 of the anchor 2 may then be placed through the hole, and a threaded cap 16 may be screwed onto the threaded post 12 to secure the post 12 in its desired position. In the embodiment illustrated in FIG. 3, a washer 15 is to be placed on the threaded post 12 and against the material to which the anchor is to be affixed, for example the inner surface of the front wall 34 of the garbage can 30. A cap 16 may then be threaded onto the post 12 when the post 12 is threaded, or otherwise affixed to the post 12 when the post 12 is otherwise configured. For example, in one embodiment, the cap 16 may be configured to fit snuggly on the post 12 where the post is smooth, or the cap may have metal, plastic, or rubber rings on its inner surface that permit the cap 16 to be slid onto the post 12, but grip the post 12 if an attempt is made to remove the cap 16 from the post 12.

The washer 15 may have a hole 42 that has a diameter larger than the post 12 and smaller than the outer diameter of the cap 16 so that the cap 16 presses the washer 15 against the material to which the anchor 2 is to be secured, thereby retaining that material between the anchor 2 and the washer 15.

The anchor 2 may be designed to attach to a vertical side 34 of a garbage can 30 as is illustrated in FIG. 1, or to another desired object or surface. The anchor 2, in a simple form, may be comprised of a nut and bolt with a slot 40 formed at the head of the bolt in which the insert 5 can be engaged. The part of the anchor 2 into which the insert 5 may be placed may be referred to as the catch or insert void 40. The shape of the catch 40 may be any shape that can engage the insert 5 of the strap 1 and may be a hollow head 2 in which to house the insert 5 of the strap 1. The strap opening 10 may be a part of the catch 40 and may be any empty space through which the strap 1 may pass when the insert 5 enters the catch 40. The catch 40 may be configured to allow entry and exit of one of the inserts 5 exclusively from one end, the first side 27 or bottom as depicted in FIG. 1, and may be configured to prevent exit of the insert 5 through the third side 29 or top 10 as depicted in FIG. 1, front 21, and second and fourth sides 22 and 24. To allow for entry of the insert 5 into the catch 40 from one end 40, no sides 22 and 24 may be provided on that end 40 of the anchor 2. The anchor 2 may, thus completely surround an insert 5 housed therein except for along on the entry end of the anchor 2 and along the strap opening 10 and slot 26 through the second plate 9. A threaded bolt 12 may extend from the back of the anchor 2, as illustrated in FIGS. 3 and 4, and the threaded bolt 12 may have a point 13 of any appropriate shape, size, type, or configuration. The point may include an apparatus or shape for creating a hole in an object, such as the front wall 34 of the garbage can 30 illustrated in FIGS. 1 and 7 or the front wall 98 of the box 90 illustrated in FIG. 10, for the bolt 12 to pass through. The anchor 2 may also include of a washer 15 that may be placed on the bolt 12 from within of the garbage can 30. The washer 15 may be of any desired shape, size, type, or configuration to prevent the threaded bolt 12 of the catch 26 from pulling outward and deforming or tearing the object to which the anchor 2 is attached, such as the front wall 34 of garbage can 30 or the front wall 98 of the box 90. The cap 16 of the anchor 2 may completely enclose the portion of the bolt 12 that extends through the object to which the anchor 2 is attached, again such as the front wall 34 of the garbage can 30 illustrated in FIGS. 1 and 7 or the front wall 98 of the box 90, beyond the washer 15 if such a washer 15 is used. The cap 16 may furthermore be smooth so as to prevent trash bags or other items from snagging on it.

In one embodiment, the post 12 of the anchor 2 includes a cutting tip 13 formed to cut a hole in plastic or metal material, for example, thereby creating the hole through which the anchor 2 will extend when affixed. Thus, for example, if the anchor 2 is to be affixed to the front wall 34 of the garbage can 30 of FIG. 1, the location for the anchor 2 may be measured or otherwise determined, the anchor 2 may be held with the tip 13 against the material such that the tip 13 of the post 12 is centered in the desired location, the anchor 2 may be pressed against the front wall 34 and the anchor 2 may be rotated while the tip 13 is pressed against the front wall 34 until the tip 13 forms the hole in the front wall 34. The washer 15 may then be placed over the post 12 if desired and the cap 16 can be affixed to the post 12, thereby attaching the anchor 2 to the front wall 34 of the garbage can 30.

FIG. 4 provides a bottom exploded view of the anchor 2 showing the anchor 2 of FIG. 3, including its back plate 11, front plate 9, walls 22 and 24, the slot 26 for the insert 5, the strap opening 10, the post 12 in a threaded configuration, the washer 15, and the cap 16. The cap 16 may simply be in the form of a nut or it may be formed with a closed end 60, as shown in FIG. 4. The cap 16 nut or end 60 may be formed smooth to reduce the likelihood that the nut or end 60 of the cap 16 will snag on material rubbing against it, such as, for example, a garbage bag. Thus, for example, the cap 16 illustrated in FIG. 4 has a closed end 16 with a rounded contour. The cap 16 and post 12 may be short to provide a minimal obstruction. The cap 16 may also be of a locking type, such as including or being a locking nut, to retain the cap 16 on the post 12 in spite of brushing that may occur against the cap 16 or vibrations that may occur in the vicinity of the cap 16.

Figure 5:
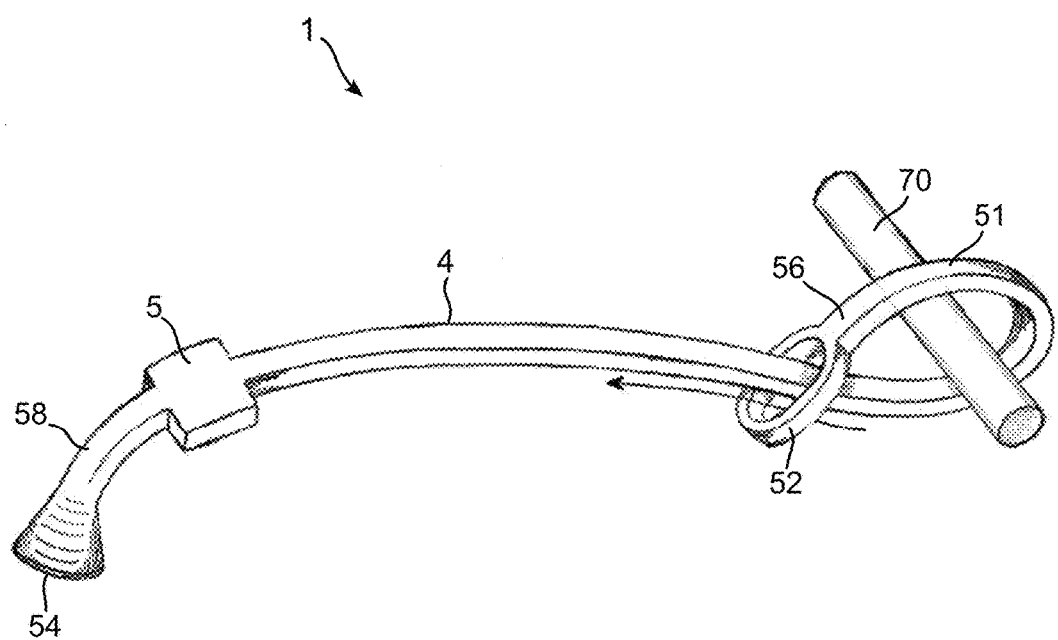
FIG. 5 illustrates a view of another embodiment of a strap of the present invention attaching to a bar.

FIG. 5 illustrates an embodiment of the strap 1 in which the strap 1 may be universally attached to any object 70 the strap 1 can be wrapped around. In the embodiment illustrated, the strap 1 is wrapped around a bar shaped object 70, which may be part of a truck bed, a trailer, a bicycle, a cooler lid, a tool chest or anything that is desired to be tied-down or to which an object is to be tied-down. The embodiment illustrated includes a single rectangular insert 5, which may be beneficial when the same item is to be retained by the strap 1, rather than the strap being for general use with a variety of items. In an embodiment, such as a trailer tie-down where items of various sizes may be desired to be tied-down, a plurality of inserts 5 may be included on the strap 1 so that the strap 1 may be employed in varying lengths to retain those various items of various sizes.

Figure 6C:
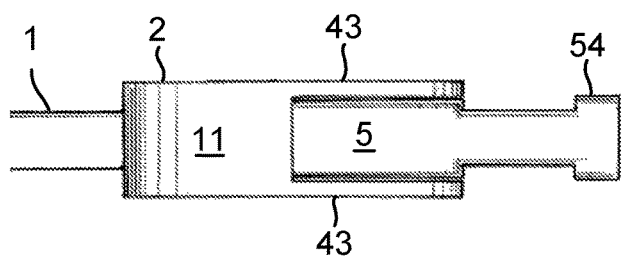
FIGS. 6A-6C illustrate views of another embodiment of a strap of the present invention latching into another embodiment of an anchor.
Figure 6B:
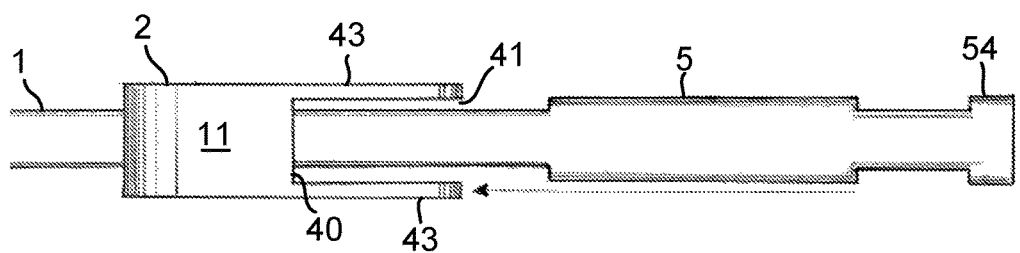
Figure 6A:
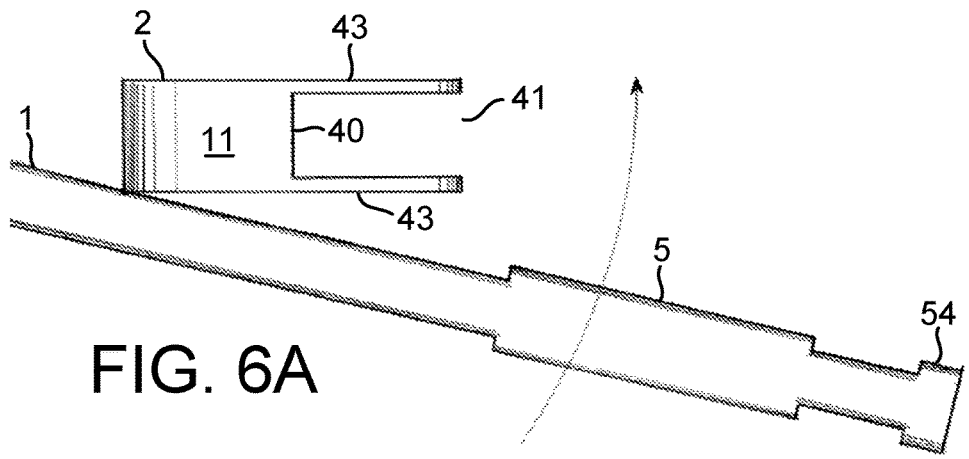

FIGS. 6A-6C illustrate attachment of the strap 1 to the anchor 2. As illustrated in FIGS. 6A-6C, the anchor 2 may be configured in a variety of ways and may include guides 43 at the insert opening 41 to assist in guiding the insert 5 into the insert void 40. The insert 5 of this embodiment is formed wider than the strap 1 and in a rectangular shape and may include a pointed or reduced or increased depth edge that may fit complimentary into the insert void 40 or guides 43 to aid in placing the insert 5 into the insert opening 41 or insert void 40.

As may be seen in FIG. 6A, the strap 1 may initially be stretched until the insert 5 is beyond the anchor 2 and the insert opening 41 of the anchor 2. The strap 1 may be moved to align the insert 5 with the insert opening 41 in the anchor 2 and then the strap 1 may be moved into the strap opening 10 and the insert may be moved into the insert void 40 (shown in FIG. 3). FIG. 6B illustrates proper alignment of the insert 5 with the insert opening 41 of the anchor 2 for insertion of the insert 5 into the insert void 40 of the anchor 2. As may be seen with reference to FIG. 6C, the insert 5 may be moved into the insert void 40 through the insert opening 41 in the anchor 2 once the insert 5 is aligned with the insert opening 41 and the insert 5 portion of the strap 1 may then be retained in place by the anchor 2 when the insert 5 is engaged by the anchor 2.

Unfastening the latch may be seen by viewing FIGS. 6A-6C in reverse order of latching described hereinabove. The hand grip 54 illustrated in FIG. 6C may be gripped and the strap 1 may then be moved or stretched away from the anchor, opposite of the direction shown in FIG. 6B. The strap 1 may then be moved from the anchor 2 as illustrated in FIG. 6A and the force placed on the hand grip 54 may be released to disengage the strap 1 from the anchor 2.

Figure 8:
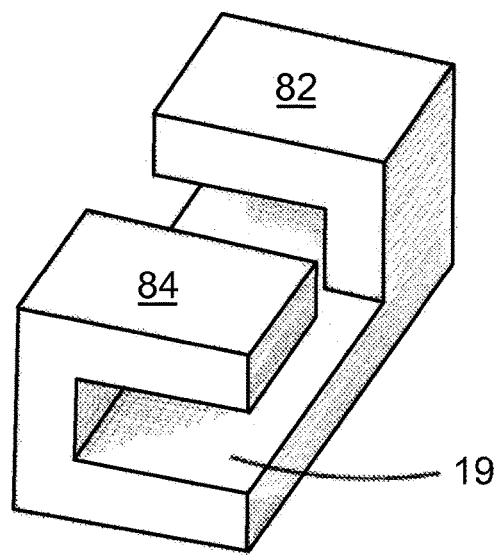
FIG. 8 illustrates a perspective view of an embodiment of a strap retainer of the present invention.

FIG. 7 illustrates the latch of FIG. 1 with a strap retainer 19. Referring to FIG. 8, the strap retainer 19 may be seen to include a base 80 and first and second retainer clips 82 and 84. The first and second retainer clips 82 and 84 are in the form of angles attached to the base 80 in the embodiment of FIG. 8. In that embodiment, the strap 1 is placed between the first retainer clip 82 and the base 80, pulled between the first retainer clip 82 and the second retainer clip 84, and then placed under the second retainer clip 84. In that way, the strap 1 is removably retained by the strap retainer 19. In operation, as may be seen with reference to FIG. 7, when the strap 1 is removed from the anchor 2, the strap may be lifted, for example using the hand grip 54, and the strap 1 may be lifted, thereby lifting the lid 36 of the garbage can 30. Such an arrangement with the strap retainer may beneficially facilitate sanitary use of the garbage can 30 since the garbage can 30 can be unlatched and its lid 36 may be opened using only the hand grip 54. A bag or other item may be placed in the garbage can 30 with the lid 36 open and the garbage can lid 36 may then be closed and latched using the strap 1 only by pulling the strap 1 to the front of the garbage can 30 and re-latching the strap 1 to the anchor 2.

Figure 9:
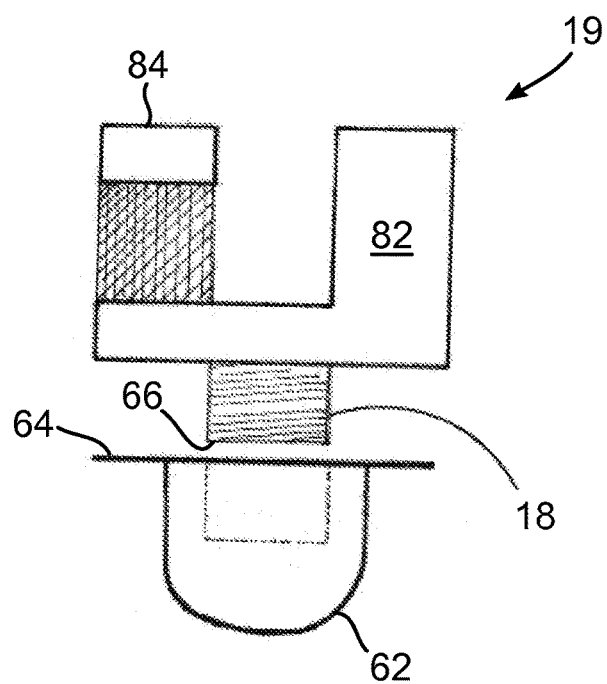
FIG. 9 illustrates an exploded end view of the strap retainer of FIG. 8.

FIG. 9 illustrates an exploded end view of the strap retainer 19 of FIG. 8. The strap retainer 19 includes a post 18 and a cap 62. The post 18 may be configured similarly to the post 12 described herein in connection with the anchor 2 and may, for example, be threaded or smooth. The cap 62 illustrated includes a compression ring 64 incorporated thereon. The compression ring 64 formed on the cap 62 may be interchangeable with the separate washer 15 described herein. The post 18 may furthermore include a cutting tip 66 that may be used similarly to the cutting tip 13 described herein in connection with the anchor 2.

To install the strap retainer 19, a hole may be made in the garbage can lid 36 or other object to which the strap retainer 19 is to be attached. That hole, like the hole through which an embodiment of the anchor 2 has been described as being mounted, may be created as desired, for example, using a knife of a drill bit or using the cutting tip 66 of the strap retainer 19. The strap retainer 19 post 18 may then be placed through the hole and the cap 62 may be secured over the post 18 to maintain the strap retainer 19 in its desired position. Alternately, the strap retainer 19 may be formed with the lid 36 or on another apparatus to which the strap 1 is desired to be attached.

It should be recognized that other configurations of the strap retainer 19 are contemplated, including any apparatus that holds the strap 1 to the lid 36 or another desired object, whether temporarily or permanently.

FIG. 10 illustrates a large box 90 on which two latches of the present invention are employed. The box 90 includes two lids 94 that are attached to the box 90 by one or more hinges 96 such that one or both of the lids 94 may be raised to open the box 90 or lowered to cover the box 90. The straps 1 may be attached around the hinge 96, a handle, or to another portion of the box 90 and the anchors 2 may be attached to the front wall 98 of the box 90.

As may be seen by reference to FIG. 10, two straps 1 may be attached to two anchors 2 separately to retain the lids 94 of the box 90 in a closed position and, in other embodiments, more than two straps 1 and anchors 2 may be employed to retain a lid 94 or other object in a desired position.

While two lids 94 are illustrated in FIG. 10, each having a strap 1 and an anchor 2, a box 90 may have a single lid 94 that is retained in a closed position by two or more straps 1 and two or more anchors 2. For example, if a box 90 is large and has a large lid 94, a corner of the lid 94 that is distant from a single strap 1 and anchor 2 may not be held securely in its closed position by a single strap 1 and anchor 2 latch, thus making it preferable to have two or more straps 1 and anchors 2 to hold the lid 94 more firmly closed.

The box 90 may be a tool box, dumpster, or any container having a lid 94 that is desired to be held in a closed position.

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed is:

1. A latch for an object, comprising:
a strap comprising:
a connector to attach the strap to the object at a first end of the strap;
a hand grip at a second end of the strap opposite the first end of the strap;
an insert attached to the strap between the connector and the hand grip; and
a body extending between the connector and the insert, the body made of a stretchable material;
and
an insert retaining anchor attachable to the object, the anchor having a slot sized to hold the insert, and including:
a first side having a first side opening that is open to the slot, the first side opening larger than the body of the strap and smaller than the insert such that the insert is retained in the slot;
a second opening in the anchor opposite the first side, the second opening open to the slot and larger than the body of the strap and the insert such that the body of the strap and the insert can pass therethrough; and
a third side extending from the first side to the second opening, the third side having an opening to the slot that extends from the first side opening to the second opening, the third side opening being wider than the body of the strap and not as wide as the insert;
wherein the body of the strap is configured to be stretched until the insert is adjacent the second opening of the anchor and unstretched such that the insert enters the anchor slot through the second opening of the anchor, and the anchor is configured such that the insert is retained in the anchor slot once placed in the anchor slot because the insert cannot pass through the first side of the anchor and cannot pass through the third side of the anchor.

2. The latch of claim 1, further comprising a plurality of inserts along the length of the strap between the first end and the second end of the strap.

3. The latch of claim 1, the anchor further comprising a post extending from the anchor to extend into the object.

4. The latch of claim 3, further comprising a cap for placing on the post and for engaging the post.

5. The latch of claim 4, further comprising a washer for placing on the post between the cap and the first plate.

6. The latch of claim 1, wherein the insert is one of rectangular, circular, and oval.

7. The latch of claim 1, wherein the anchor is affixed to the object by adhesive.

8. The latch of claim 1, wherein the insert is formed of one of metal and plastic.

9. The latch of claim 1, wherein the strap is formed of one of a rubber and a rubberized composite.

10. The latch of claim 9, wherein the insert includes one of metal and plastic covered by one of rubber and rubberized plastic.

11. The latch of claim 1, wherein the anchor is formed on the object.

12. The latch of claim 1, wherein the connecting apparatus is a loop.

13. The latch of claim 1, wherein the object is a garbage can and the anchor is attached to the garbage can.

14. The latch of claim 1, the slot having a width and a depth and the insert having a width and a depth, the slot width being wider than the insert width and the slot depth being deeper than the insert depth.

15. The latch of claim 14, the strap having a depth and the slot depth being deeper than the strap depth.

16. The latch of claim 1, wherein the connector is an eyelet having a hole that is of a size to permit the hand grip, the body, and the insert of the strap to pass through the eyelet.

17. The latch of claim 1, wherein the insert has a width and at least a portion of the opening in the third side has a width that is less than the width of the insert.

* * * * *